United States Patent
Rezakhani

(10) Patent No.: US 12,530,950 B1
(45) Date of Patent: Jan. 20, 2026

(54) SYSTEM AND METHOD FOR AUTHORIZING MOVEMENT OF ENTITIES IN MONITORED ZONES

(71) Applicant: KAZEM JOHN, LLC, Boynton Beach, FL (US)

(72) Inventor: Kazem J. Rezakhani, Boynton Beach, FL (US)

(73) Assignee: KAZEM JOHN, LLC, Boynton Beach, FL (US)

( * ) Notice: Subject to any disclaimer, the term of this patent is extended or adjusted under 35 U.S.C. 154(b) by 0 days.

(21) Appl. No.: 19/076,001

(22) Filed: Mar. 11, 2025

(51) Int. Cl.
*G08B 13/196* (2006.01)
*H04W 12/06* (2021.01)

(52) U.S. Cl.
CPC . *G08B 13/19652* (2013.01); *G08B 13/19602* (2013.01); *H04W 12/06* (2013.01)

(58) Field of Classification Search
CPC ....... G08B 13/19652; G08B 13/19602; H04W 12/06; H04L 63/08
See application file for complete search history.

(56) References Cited

U.S. PATENT DOCUMENTS

| | | | |
|---|---|---|---|
| 7,034,675 B2 | 4/2006 | DiPoala et al. | |
| 7,061,381 B2 | 6/2006 | Forcier et al. | |
| 9,887,775 B2 | 2/2018 | Puscase et al. | |
| 9,952,349 B1 | 4/2018 | Zhevelev et al. | |
| 2015/0263806 A1* | 9/2015 | Puscasu | F41H 13/00 398/130 |
| 2015/0356289 A1* | 12/2015 | Brown | G06F 21/35 726/7 |
| 2022/0279361 A1* | 9/2022 | Friday | H04W 4/80 |
| 2023/0308851 A1* | 9/2023 | Mars | H04W 12/47 |
| 2025/0071536 A1* | 2/2025 | Mars | H04W 12/06 |

FOREIGN PATENT DOCUMENTS

| | | |
|---|---|---|
| CN | 101635080 | 1/2010 |
| WO | 20010167414 A1 | 9/2001 |

\* cited by examiner

*Primary Examiner* — Mirza F Alam
(74) *Attorney, Agent, or Firm* — Sagacity Legal PLLC

(57) ABSTRACT

A system for authorizing movement of an entity in a zone is described. The system includes a monitoring system and an electronic device associated with an entity. The monitoring system is configured to detect the movement of the entity within the zone and transmit a first encrypted wireless signal. The electronic device is configured to receive the first encrypted wireless signal, decrypt the first encrypted wireless signal, generate a second encrypted wireless signal based on the decryption, and transmit the second encrypted wireless signal to the monitoring system. The monitoring system is configured to receive the second encrypted wireless signal and authenticate the electronic device based on the received second encrypted wireless signal. The monitoring system is configured to authorize the detected movement of the entity upon the authentication of the electronic device and deactivate an alarm or a response device based on the authorization.

19 Claims, 8 Drawing Sheets

SYSTEM AND METHOD FOR AUTHORIZING MOVEMENT OF ENTITIES IN MONITORED ZONES

BACKGROUND OF THE INVENTION

Oftentimes, for security purposes, motion detection and alarm systems are installed in or around different private areas or enclosures including, but not limited to, houses, government or military buildings or areas, or wildlife protection zones, parks, or areas. Conventional motion detection and alarm systems are configured to trigger an alert or an alarm in response to any movement of people, animals, or machines detected in a vicinity of such conventional motion detection and alarm systems. However, such a configuration may be undesirable since the movement of any individual, animal, or machine including those of identifiable entities such as, but not limited to, pets, members, or vehicles associated with the private enclosures, may cause the motion detection and alarm systems to needlessly and repeatedly trigger the alarm in some instances.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
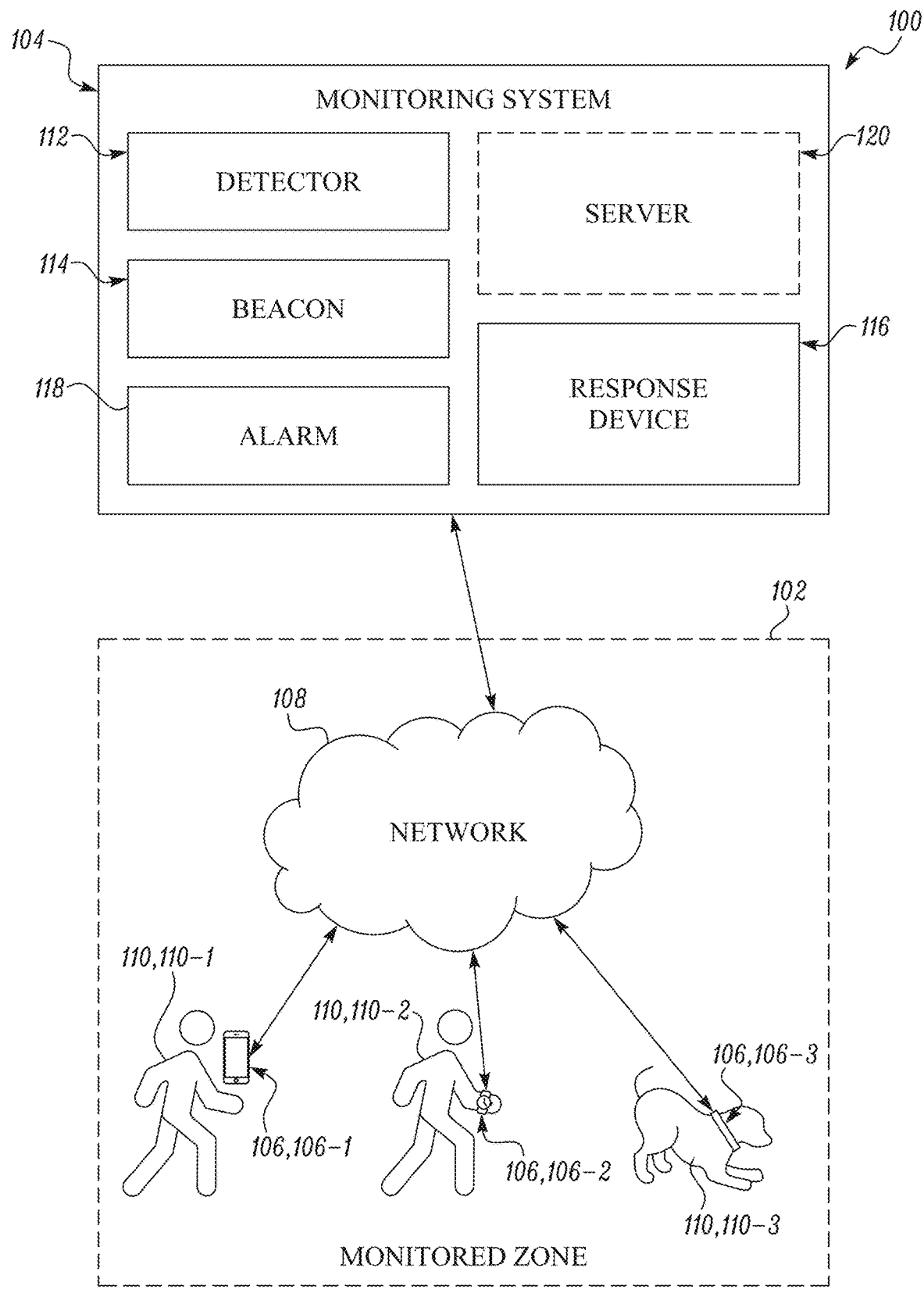
FIG. 1 illustrates an exemplary system for authorizing movement of at least one entity in at least one zone, in accordance with some embodiments.

Skilled artisans will appreciate that elements in the figures are illustrated for simplicity and clarity and have not necessarily been drawn to scale. For example, the dimensions of some of the elements in the figures can be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the description with details that will be readily apparent to those of ordinary skill in the art having the benefit of the description herein.

DETAILED DESCRIPTION OF THE INVENTION

In one aspect, a system for authorizing movement of at least one entity in at least one zone is described. The system includes at least one monitoring system and at least one electronic device associated with the at least one entity. The at least one monitoring system includes at least one detector and at least one beacon communicatively coupled to the at least one detector. The at least one monitoring system is configured to detect, via the at least one detector and at least one processor of the at least one monitoring system, the movement of the at least one entity within the at least one zone and transmit, via the at least one processor and the beacon, a first encrypted wireless signal in response to the detected movement. The least one electronic device is configured to receive, via a transceiver of the at least one electronic device, the first encrypted wireless signal when the at least one electronic device is within a range of the first encrypted wireless signal and decrypt, via a processor of the at least one electronic device, the first encrypted wireless signal. The least one electronic device is further configured to generate, via the processor, a second encrypted wireless signal based on the decryption, and transmit, via the processor and the transceiver, the second encrypted wireless signal to the at least one monitoring system. The at least one monitoring system further includes an alarm or a response device. The at least one monitoring system is configured to receive, via the beacon, the second encrypted wireless signal and authenticate, via the at least one processor, the at least one electronic device based on the received second encrypted wireless signal. The at least one monitoring system is further configured to authorize the detected movement of the at least one entity upon the authentication of the at least one electronic device and deactivate the alarm or the response device based on the authorization.

In another aspect, a system for self-authentication of at least one electronic device associated with an entity during movement in at least one zone is described. The system includes the at least one electronic device configured to detect, via a processor and a transceiver of the at least one electronic device, at least one monitoring system within a proximity of the at least one electronic device during the movement and transmit, via the processor and the transceiver, an encrypted wireless signal based on the detection, wherein the encrypted wireless signal comprises self-authentication data associated with the at least one electronic device. The system further includes at least one monitoring system including at least one processor, a beacon, and an alarm or a response device. The at least one monitoring system is configured to receive, via the beacon, the encrypted wireless signal and decrypt, via the at least one processor, the encrypted wireless signal. The at least one monitoring system is further configured to obtain the self-authentication data based in the decryption and authenticate, via the at least one processor, the at least one electronic device based on the self-authentication data. Further, the at least one monitoring system is configured to authorize the movement of the at least one entity based on the authentication and activate or deactivate the alarm or the response device based on the authorization.

In yet another aspect, a method for authorizing movement of at least one entity within at least one zone is described. The method includes detecting, via a detector and at least one processor of at least one monitoring system, a movement within the at least one zone, transmitting, via the at least one processor and a beacon of the at least one monitoring system, a first encrypted wireless signal based on the detection, and receiving, via a transceiver of at least one electronic device associated with the at least one entity, the first encrypted wireless signal when the at least one electronic device is within a range of the first encrypted wireless signal. The method further includes decrypting, via a processor of the at least one electronic device, the first encrypted wireless signal, generating, via the processor, a second encrypted wireless signal based on the decryption, and transmitting, via the processor and the transceiver, the second encrypted wireless signal to the at least one monitoring system. Further, the method includes authenticating, via the at least one processor, the at least one electronic device based on the second encrypted wireless signal, authorizing, via the at least one processor, the detected movement based on the authentication, and activating or deactivating, via the at least one processor, an alarm or response device based on the authorization.

Referring to FIG. 1, an exemplary system 100 for authorizing movement of at least one entity 110 in at least one zone 102 is illustrated. The zone 102 corresponds to any designated area or space that is defined by a specific purpose, characteristics, or regulations. For example, the zone 102 includes one or more of a residential area (such as, but not limited to, a house, an apartment, and/or a surrounding area), a natural area (such as, but not limited to, a forest, or a wildlife reserve), a government area (such as, but not limited to, a military base, a government building, or an embassy), a public area (such as, but not limited to, a park, or a shopping mall), an industrial area (such as, but not limited to, a factory, an office or office building, or a warehouse), an agricultural area (such as, but not limited to a farmland), or any specialized area (such as, but not limited to, an airport or a border control zone). The entity 110 corresponds to at least one of a human, an animal, or a manually controlled or autonomous machine or vehicle or any other entity with motion now known or in the future developed.

The system 100 includes at least one monitoring system 104 and at least one electronic device 106 (for example, but not limited to, the electronic devices 106-1, 106-2, and 106-3). In accordance with various embodiments, each electronic device 106 is associated, for example, worn or attached to, the corresponding entity 110. For example, as illustrated, the electronic device 106-1 is associated with the entity 110-1, the electronic device 106-2 is associated with the entity 110-2, and the electronic device 106-3 is associated with the entity 110-3. The monitoring system 104 and the electronic devices 106 are communicatively coupled to each other via a communication network 108 (referred also interchangeably as network 108). The network 108 is a secure network including, but not limited to, a Local Area Network (LAN), a Wireless Local Area Network (WLAN), a Wireless Personal Area Network (WPAN), a Small Area Network (SAN), a telecommunication network including, but not limited to, a fourth generation (4G) and a fifth generation (5G) cellular network, and other wireless communication networks employing infra-red beams/signals, radio frequency (RF) signals, or other forms of wireless communication, and utilizing any of a variety of communications protocols, as is now known or in the future developed.

In accordance with various embodiments, the monitoring system 104 is configured to detect the movement of the entity 110 within the zone 102 and transmit a first encrypted wireless signal in the zone 102 in response to the detected movement. The monitoring system 104 is further configured to authenticate the electronic device 106 (associated with the entity 110) based on a second encrypted wireless signal received from the electronic device 106 and authorize the detected movement of the corresponding entity 110 upon the authentication of the electronic device 106. The monitoring system 104 is further configured to deactivate an alarm 118 or a response device 116 based on the authorization. In some embodiments, for example, upon non-receipt of the second encrypted wireless signal within a predefined time duration or a failure of the authentication of the at least one electronic device, the monitoring system 104 is configured to activate the alarm 118 and/or the response device 116 (described in detail below).

In accordance with various embodiments, the first encrypted wireless signal corresponds to any encrypted challenge signal transmitted from the monitoring system 104 for authentication of the electronic device 106. For example, the first encrypted wireless signal includes a challenge for the electronic device 106. In some embodiments, the first encrypted wireless signal includes a dynamic key valid for the predefined time duration for authentication of the electronic device 106. The second encrypted wireless signal corresponds to any encrypted challenge response signal transmitted by the electronic device 106 for the authentication of the electronic device 106 to the monitoring system 104. For example, the second encrypted wireless signal includes a challenge response to the challenge provided in the first encrypted wireless signal. In some embodiments, the second encrypted wireless signal includes at least one of a first identification of the second encrypted wireless signal, a code, a certificate of the electronic device 106, a radio-frequency fingerprint of the second encrypted wireless signal, the challenge response, or any other identification now known or in the future developed. For example, each communication session between the monitoring system 104 and the electronic device 106 is applicable for a predefined time period and each communication session implements a one-time-use code or a 'rolling code' to enable the monitoring system 104 to verify, validate, and/or authenticate the electronic device 106 for the corresponding communication session. Further, the one-time-use code is updated or modified for each subsequent communication session after the predefined time period of a current communication session. In another example, the second encrypted wireless signal includes one or more device authentication certificates to be validated by the monitoring system 104. As another example, the second encrypted signal includes the radio-frequency fingerprint corresponding to a predefined radio waveform transmitted by and uniquely identifying the electronic device 104, thereby enabling the monitoring system 104 to verify/validate the electronic device 106.

The various components of the monitoring system 104 will now be described hereinafter with respect to FIG. 1. It should be appreciated by those of ordinary skill in the art that FIG. 1 depicts the monitoring system 104 in a simplified manner and a practical embodiment includes additional components and suitably configured logic to support known or conventional operating features that are not described in detail herein. Although the monitoring system 104 is illustrated and described to be implemented within a single device, it is contemplated that the one or more components of the monitoring system 104 are alternatively implemented in a distributed computing environment, without deviating from the scope of the claimed subject matter. It will further be appreciated by those of ordinary skill in the art that one or more components of the monitoring system 104 alternatively functions within a remote server, cloud computing device, or any other remote computing mechanism now known or developed in the future.

The monitoring system 104 includes at least one detector 112, at least one beacon 114, the response device 116, the alarm 118, and a server 120. The components of the monitoring system 104, including the detector 112, the beacon 114, the response device 116, the alarm 118, and the server 120 are communicatively coupled one another to enable operations of the monitoring system 104. In accordance with various embodiments when the components of the monitoring system 104 are implemented within a single device, each component communicates with one another via a monitoring system local interface (not illustrated). The monitoring system local interface includes, but not limited to, one or more buses or other wired or wireless connections, as is known in the art. The monitoring system local interface includes additional elements, which are omitted for simplicity, such as controllers, buffers (caches), drivers, repeaters, and receivers, among many others, to enable communications. Further, the monitoring system local interface includes address, control, and/or data connections to enable appropriate communications among the aforementioned components.

Figure 2:
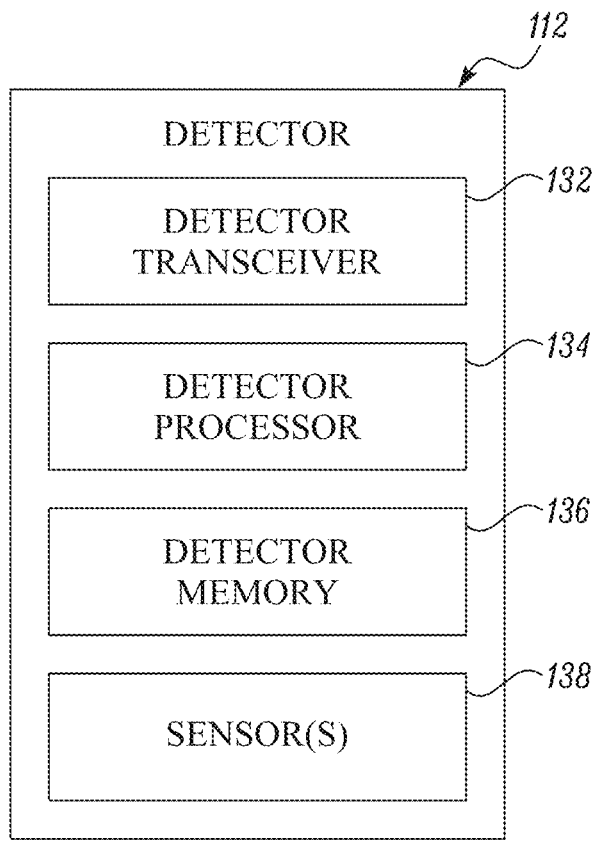
FIG. 2 illustrates a block diagram of an exemplary detector for use within the system of FIG. 1, in accordance with some embodiments.

In accordance with various embodiments, the detector 112 is configured to detect the movement of the entity 110 within the zone 102 and sends a signal to the beacon 114 to transmit the first encrypted wireless signal in the zone 102 in response to the detected movement. In accordance with various embodiments, detecting the movement of the entity 110 also includes detecting a presence of the entity 110 in the zone 102 without deviating from the scope of the present description. The detector 112 corresponds to any motion detection device configured to detect the movement of the entity 110 within the zone 102. For example, the detector 112 corresponds to any motion sensing device now known or in the future developed to detect the movement of the entity 110 within the zone 102. The various components of the detector 112 will now be described hereinafter with respect to FIG. 2. It should be appreciated by those of ordinary skill in the art that FIG. 2 depicts the detector 112 in a simplified manner and a practical embodiment includes additional components and suitably configured logic to support known or conventional operating features that are not described in detail herein. Although the detector 112 is illustrated and described to be implemented within a single communication device, it is contemplated that the one or more components of the detector 112 are alternatively implemented in a distributed computing environment.

Referring to FIG. 2, the detector 112 includes, among other components, a detector transceiver 132, a detector processor 134, a detector memory 136, and one or more sensors 138. The components of the detector 112, including the detector transceiver 132, the detector processor 134, the detector memory 136, and the sensor 138, cooperate with one another to enable operations of the detector 112. Each component communicates with one another via a detector local interface (not illustrated). The detector local interface includes, but not limited to, one or more buses or other wired or wireless connections, as is known in the art. The detector local interface includes additional elements, which are omitted for simplicity, such as controllers, buffers (caches), drivers, repeaters, and receivers, among many others, to enable communications. Further, the detector local interface includes address, control, and/or data connections to enable appropriate communications among the aforementioned components.

As illustrated, the detector 112 includes the detector transceiver 132 to transmit data and/or signals to and receive data and/or signals from one or more other components of the monitoring system 104, such as, (as illustrated in FIG. 1) the beacon 114 and the server 120. For example, the detector transceiver 132 is configured to transmit the signal to the beacon 114 to transmit the first encrypted wireless signal in response to the detected movement of the entity within the zone 102. Similarly, in some embodiments, the detector transceiver 132 is configured to transmit at least one input associated with the detected movement to the server 120. For example, the at least one input includes data (for example, but not limited to, temperature data, visual image data, or thermal image data or any other detection data now known or in the future developed) associated with the zone 102 for detecting the movement of the entity 110 within the zone 102. The detector transceiver 132 includes a transmitter circuitry and a receiver circuitry to enable the detector 112 to communicate with the one or more other components. In this regard, the transmitter circuitry includes appropriate circuitry to transmit the one or more signals to the one or more other components and the receiver circuitry includes appropriate circuitry to receive the one or more signals from the one or more other components. It will be appreciated by those of ordinary skill in the art that the detector 112 includes a single detector transceiver 132 as illustrated, or alternatively separate transmitting and receiving components, for example but not limited to, a transmitter, a transmitting antenna, a receiver, and a receiving antenna. In some embodiments, when the components of the monitoring system 104 are implemented within a single device, the detector 112 communicates with the one or more other components using any on-board communication, for example, the monitoring system local interface.

The detector memory 136 is a non-transitory memory configured to store a set of instructions that are executable by the detector processor 134 to perform predetermined operations. For example, the detector memory 136 includes any of the volatile memory elements (for example, random access memory (RAM)), non-volatile memory elements (for example, read only memory (ROM)), and combinations thereof. Moreover, the detector memory 136 incorporates electronic, magnetic, optical, and/or other types of storage media. In accordance with various embodiments, the detector memory 136, for example, is configured to store a predetermined temperature threshold value and a predetermined thermal threshold value for detecting the movement of the entity 110 within the zone 102.

The detector processor 134 is configured to execute the instructions stored in the detector memory 136 to perform the predetermined operations. The detector processor 134 includes one or more microprocessors, microcontrollers, DSPs (digital signal processors), state machines, logic circuitry, or any other device or devices that process information or signals based on operational or programming instructions. The detector processor 134 is implemented using one or more controller technologies, such as Application Specific Integrated Circuit (ASIC), Reduced Instruction Set Computing (RISC) technology, Complex Instruction Set Computing (CISC) technology, or any other similar technology now known or in the future developed. The detector processor 134 is configured to cooperate with other components of the detector 112 to perform its operations (described in detail with reference to FIG. 8).

The sensor 138 is configured to detect the movement of the entity 110 within the zone 102. To this end, the sensor 138 is configured to capture data associated with changes in the zone 102 that indicates the movement of the entity 110 within the zone 102. In an embodiment, the sensor 138 corresponds to an infra-red sensor configured to measure infrared radiations within the zone 102 to detect changes in temperature of the zone 102. As known in the art, when an entity (for example, the entity 110) is present within the zone 102, the infra-red radiations (for example, the heat) from the entity 110 present within the zone 102 change the temperature of the zone 102. The infra-red sensor is configured to measure these changes in the infrared radiations in the zone 102 to determine the movement of the entity 110 within the zone 102 and determine the movement of the entity 110 in the zone 102 when the change in the temperature (interchangeably referred to as the temperature data) of the zone 102 is greater than the predefined temperature threshold value during a predefined time interval. In accordance with various embodiments, the predefined time interval is a time interval predefined by a user or a programmer of the monitoring system 104. It would be appreciated by a person skilled in the art that although the sensor 138 is described as the infra-red sensor, the sensor 138 in some embodiments, includes an ultrasonic sensor, a microwave sensor, a radar sensor, a proximity sensor, or any other motion detection sensor known in the art or developed in the future.

In some embodiments, the sensor 138 also includes an infra-red camera configured to measure infrared radiations within the zone 102 and convert the measured infrared radiations into a thermal image. The infra-red camera is further configured to determine a changes in the heat pattern between two or more thermal images captured between the predefined time interval, for example, using one or more motion detection algorithms and detect the movement of the entity 110 in the zone 102 when the changes in the heat pattern between the two or more thermal images (interchangeably referred to as the thermal image data) is greater than the predefined thermal threshold value. In some embodiments, the detector processor 134 is configured to obtain the two or more thermal images from the infra-red camera and determine the movement of the entity 110 in the zone 102 when the changes in the heat pattern between the two or more thermal images is greater than the predefined thermal threshold value. It would be appreciated by a person skilled in the art that although the sensor 138 is described as the infra-red camera, the sensor 138 includes any motion detection camera known in the art or developed in the future.

For example, in an embodiment, the sensor 138 corresponds to a camera configured to capture one or more visual images of the zone 102. The camera corresponds to any image capturing device, such as monochrome digital cameras, high-resolution digital cameras, or any suitable digital cameras. For example, the camera includes still camera, camcorder, video camera, Closed-Circuit Television (CCTV) camera, or any device known in the art or in the future developed to capture images of the zone 102. In accordance with various embodiments, the sensor 138 is configured to transmit data associated with the visual images (interchangeably referred to as the visual image data) to the server processor 156 or the detector processor 134 for detecting the movement of the entity 110 within the zone 102, as described in detail below.

In some alternate embodiments, the detector processor 134 is configured to obtain data, for example, the temperature and/or the thermal images from the sensor 138 and determine the movement of the entity 110 in the zone 102 based on the obtained data using the same process as described above. In some alternate embodiments, the detector transceiver 132 is configured to transmit the temperature data and/or the thermal images (hereinafter interchangeably referred to as at least one input) captured by the sensor 138 to the server 120 for detecting the movement of the entity 110 in the zone 102 based on the at least one input (using the same process as described above).

Figure 3:
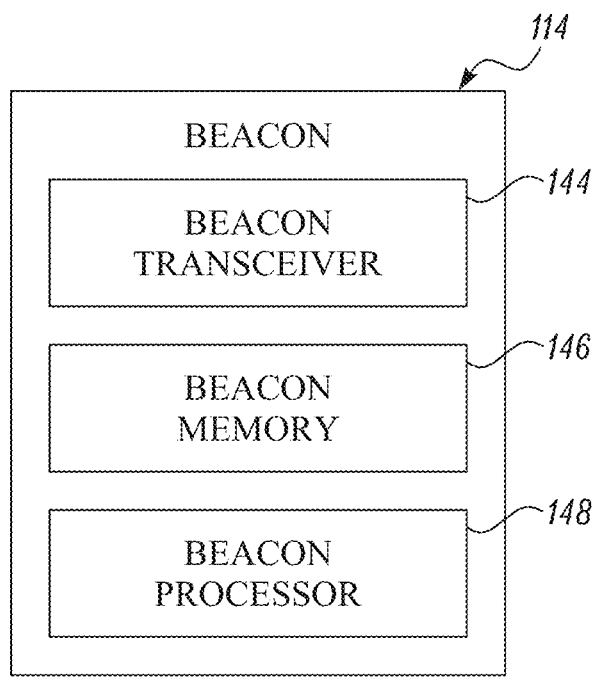
FIG. 3 illustrates a block diagram of an exemplary beacon for use within the system of FIG. 1, in accordance with some embodiments.

Referring back to FIG. 1, the beacon 114 is configured to transmit the first encrypted wireless signal in response to the detected movement of the entity 110 within the zone 102 and receive the second encrypted signal from the electronic device 106 associated with the entity 110 present within the zone 102. The beacon 114 corresponds to any low energy device now known or in the future developed to broadcast signals to and/or receive signals from nearby devices (for example, the electronic devices 106) in a pre-defined area (for example, the zone 102). For example, the beacon 114 corresponds to an infra-red beacon configured to broadcast and receive infra-red signals. It would be appreciated by a person skilled in the art that although the beacon 114 is described as the infra-red beacon, the beacon 114 can include other types of beacons such as, radio beacon, wireless Fidelity (WiFi) beacon, satellite radio beacons or any other types of beacons now known or developed in future. The various components of the beacon 114 will now be described hereinafter with respect to FIG. 3. It should be appreciated by those of ordinary skill in the art that FIG. 3 depicts the beacon 114 in a simplified manner and a practical embodiment includes additional components and suitably configured logic to support known or conventional operating features that are not described in detail herein. Although the beacon 114 is illustrated and described to be implemented within a single communication device, it is contemplated that the one or more components of the beacon 114 are alternatively implemented in a distributed computing environment.

Referring to FIG. 3, the beacon 114 includes, among other components, a beacon transceiver 144, a beacon processor 148, and a beacon memory 146. The components of the beacon 114, including the beacon transceiver 144, the beacon processor 148, and the beacon memory 146, cooperate with one another to enable operations of the beacon 114. Each component communicates with one another via a beacon local interface (not illustrated). The beacon local interface includes, but not limited to, one or more buses or other wired or wireless connections, as is known in the art. The beacon local interface includes additional elements, which are omitted for simplicity, such as controllers, buffers (caches), drivers, repeaters, and receivers, among many others, to enable communications. Further, the beacon local interface includes address, control, and/or data connections to enable appropriate communications among the aforementioned components.

As illustrated, the beacon 114 includes the beacon transceiver 144 to transmit one or more signals to and receive one or more signals from one or more devices and/or one or more other components of the monitoring system 104. In accordance with various embodiments, the beacon transceiver 144 is configured to transmit and/or receive low energy signals from the electronic devices 106 within the zone 102. For example, the beacon transceiver 144 is configured to broadcast the first encrypted signal to the electronic devices 106 within the zone 102 and receive the second encrypted signal from the electronic devices 106 within the zone 102. In an exemplary embodiment, when the beacon 114 corresponds to the infra-red beacon, the first encrypted signal and/or the second encrypted signal correspond to infra-red signals. In some embodiments, the beacon transceiver 144 is configured to receive the signal from the detector 112 and/or the server 120 to transmit the first encrypted wireless signal in response to the detected movement of the entity within the zone 102. The beacon transceiver 144 includes a transmitter circuitry and a receiver circuitry to enable the beacon 114 to communicate with the electronic devices 106 and/or the other components of the monitoring system 104. In this regard, the transmitter circuitry includes appropriate circuitry to transmit the one or more signals to and the receiver circuitry includes appropriate circuitry to receive the one or more signals from the electronic devices 106 and/or the other components of the monitoring system 104. It will be appreciated by those of ordinary skill in the art that the beacon 114 includes a single beacon transceiver 144 as illustrated, or alternatively separate transmitting and receiving components, for example but not limited to, a transmitter, a transmitting antenna, a receiver, and a receiving antenna. In some embodiments, when the components of the monitoring system 104 are implemented within a single device, the beacon 114 communicates with the one or more other components using any on-board communication, for example, the monitoring system local interface.

The beacon memory 146 is a non-transitory memory configured to store a set of instructions that are executable by the beacon processor 148 to perform predetermined operations. For example, the beacon memory 146 includes any of the volatile memory elements (for example, random access memory (RAM)), non-volatile memory elements (for example, read only memory (ROM)), and combinations thereof. Moreover, the beacon memory 146 incorporates electronic, magnetic, optical, and/or other types of storage media. In some embodiments, the beacon memory 146 is configured to store at least one key associated with the encryption and/or decryption of the first encrypted wireless signal and the second encrypted wireless signal. In some embodiments, the beacon memory 146 is configured to store at least one of a second identification of the second encrypted wireless signal, the code, the certificates of the electronic devices 106, the radio-frequency fingerprint of the second encrypted wireless signal, or the challenge response.

The beacon processor 148 is configured to execute the instructions stored in the beacon memory 146 to perform the predetermined operations. The beacon processor 148 includes one or more microprocessors, microcontrollers, DSPs (digital signal processors), state machines, logic circuitry, or any other device or devices that process information or signals based on operational or programming instructions. The beacon processor 148 is implemented using one or more controller technologies, such as Application Specific Integrated Circuit (ASIC), Reduced Instruction Set Computing (RISC) technology, Complex Instruction Set Computing (CISC) technology, or any other similar technology now known or in the future developed. The beacon processor 148 is configured to cooperate with other components of the beacon 114 to perform its operations.

In accordance with various embodiments, the beacon processor 148 is configured to control the beacon transceiver 144 to transmit or broadcast the first encrypted wireless signal and receive the second encrypted wireless signal from the electronic devices 106. In some embodiments, the beacon processor 148 is configured to generate the first encrypted wireless signal and authenticate the electronic device 106 based on the received second encrypted wireless signal (as described in detail below with reference to FIG. 8).

Referring back to FIG. 1, the server 120 is configured to authenticate the electronic device(s) 106 based on the received second encrypted wireless signal and authorize the detected movement of the entity 110 upon the authentication of the corresponding electronic device 106. In some embodiments, the server 120 is configured to control and/or instruct the one or more other components of the monitoring system 104 to perform their operations. For example, the server 120 is configured to control and/or instruct the detector 112 to detect the movement of the entity 110 within the zone 102. Similarly, the server 120 is configured to control the beacon 114 to transmit the first encrypted wireless signal in response to the detected movement of the entity 110 within the zone 102 and receive the second encrypted signal from the electronic device 106 associated with the entity 110 present within the zone 102. Further, the server 120 is configured to activate or deactivate the alarm 118 and/or the response device 116 based on the authorization.

Figure 4:
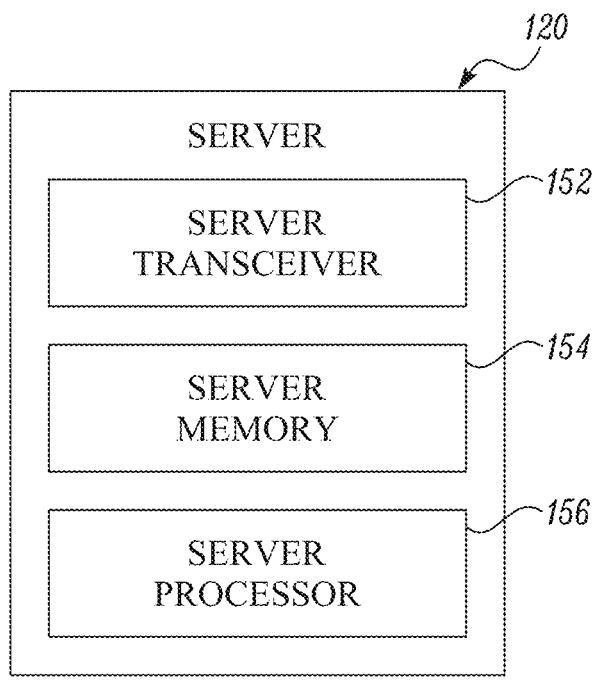
FIG. 4 illustrates a block diagram of an exemplary server for use within the system of FIG. 1, in accordance with some embodiments.

The various components of the server 120 will now be described hereinafter with respect to FIG. 4. It should be appreciated by those of ordinary skill in the art that FIG. 4 depicts the server 120 in a simplified manner and a practical embodiment includes additional components and suitably configured logic to support known or conventional operating features that are not described in detail herein. Although the server 120 is illustrated and described to be implemented within a single communication device, it is contemplated that the one or more components of the server 120 are alternatively implemented in a distributed computing environment. It will further be appreciated by those of ordinary skill in the art that one or more components of the server 120 alternatively functions within a remote server, cloud computing device, or any other remote computing mechanism now known or developed in the future.

Referring to FIG. 4, the server 120 includes, among other components, a server transceiver 152, a server processor 156, and a server memory 154. The components of the server 120, including the server transceiver 152, the server processor 156, and the server memory 154, cooperate with one another to enable operations of the server 120. Each component communicates with one another via a server local interface (not illustrated). The server local interface includes, but not limited to, one or more buses or other wired or wireless connections, as is known in the art. The server local interface includes additional elements, which are omitted for simplicity, such as controllers, buffers (caches), drivers, repeaters, and receivers, among many others, to enable communications. Further, the server local interface includes address, control, and/or data connections to enable appropriate communications among the aforementioned components.

As illustrated, the server 120 includes the server transceiver 152 to transmit one or more signals to and receive one or more signals from one or more devices and/or other components of the monitoring system 104. For example, the server transceiver 152 is configured to receive the second encrypted wireless signal, via the beacon 114, from the electronic device 106 and transmit a signal to the alarm 118 and/or the response device 116 to deactivate or activate the alarm 118 and/or the response device 116 based on the authorization. In some embodiments, the server transceiver 152 is configured to receive the at least one input associated with the detected movement from the detector 112 and initiate the transmission of the first encrypted wireless signal via the beacon 114 based on the at least one received input. The server transceiver 152 includes a transmitter circuitry and a receiver circuitry to enable the server 120 to communicate with the one or more devices and/or other components of the monitoring system 104. In this regard, the transmitter circuitry includes appropriate circuitry to transmit the one or more signals to and the receiver circuitry includes appropriate circuitry to receive the one or more signals from the one or more devices and/or other components of the monitoring system 104. It will be appreciated by those of ordinary skill in the art that the server 120 includes a single server transceiver 152 as illustrated, or alternatively separate transmitting and receiving components, for example but not limited to, a transmitter, a transmitting antenna, a receiver, and a receiving antenna. In some embodiments, when the components of the monitoring system 104 are implemented within a single device, the server 120 communicates with the one or more other components using any on-board communication, for example, the monitoring system local interface.

The server memory 154 is a non-transitory memory configured to store a set of instructions that are executable by the server processor 156 to perform predetermined operations. For example, the server memory 154 includes any of the volatile memory elements (for example, random access memory (RAM)), non-volatile memory elements (for example, read only memory (ROM)), and combinations thereof. Moreover, the server memory 154 incorporates electronic, magnetic, optical, and/or other types of storage media. In accordance with various embodiments, the server memory 154 is configured to store the predetermined temperature threshold value and the predetermined thermal threshold value for detecting the movement of the entity 110 within the zone 102. In some embodiments, the server memory 154 is configured to store at least one of a second identification of the second encrypted wireless signal, the code, the certificates of the electronic devices 106, the radio-frequency fingerprint of the second encrypted wireless signal, or the challenge response. In some embodiments, the server memory 154 is configured to store the at least one key associated with the encryption and/or decryption of the first encrypted wireless signal and the second encrypted wireless signal.

The server processor 156 is configured to execute the instructions stored in the server memory 154 to perform the predetermined operations. In accordance with various embodiments, the server processor 156 is configured to generate the first encrypted wireless signal and broadcast, via the beacon 114, the first encrypted wireless signal in the zone 102. The server processor 156 is further configured to authenticate the electronic device 106 based on the received second encrypted wireless signal and authorize the detected movement of the entity 110 upon the authentication of the corresponding electronic device 106. The server processor 156 is further configured to deactivate the alarm 118 or the response device 116 based on the authorization and/or activate the alarm 118 or the response device 116 upon non-receipt of the second encrypted wireless signal within the predefined time duration or a failure of the authentication of the electronic device 106. In accordance with various embodiments, the server processor 156 is configured to authorize the detected movement or deactivate the alarm 118 or the response device 116 for a predetermined time duration. The predetermined time duration is any time duration predetermined by the programmer or the user of the monitoring system 104.

In some embodiments, the server processor 156 (hereinafter interchangeably referred to as a processor or at least one processor of the monitoring system 104) corresponds to the detector processor 134 (hereinafter interchangeably referred to as a first processor) associated with the detector 112 to detect the movement and/or the beacon processor 148 (hereinafter interchangeably referred to as a second processor) associated with the beacon 114 to transmit the first encrypted signal based on the detected movement. In such cases, the server processor 156 is configured to receive, via the server transceiver 152, the at least one input (for example, the temperature data and/or the thermal images) associated with the detected movement from the detector transceiver 132 of the detector 112 and detect the movement of the entity 110 within the zone 102 based on the at least one input. The server processor 156 is further configured to initiate the transmission of the first encrypted wireless signal via the beacon transceiver 144 of the beacon 114 based on the at least one received input, for example, in response to the detected movement.

The server processor 156 includes one or more microprocessors, microcontrollers, DSPs (digital signal processors), state machines, logic circuitry, or any other device or devices that process information or signals based on operational or programming instructions. The server processor 156 is implemented using one or more controller technologies, such as Application Specific Integrated Circuit (ASIC), Reduced Instruction Set Computing (RISC) technology, Complex Instruction Set Computing (CISC) technology, or any other similar technology now known or in the future developed. The server processor 156 is configured to cooperate with other components of the server 120 to perform its operations (described in detail with reference to FIG. 8).

Referring back to FIG. 1, the response device 116 and/or the alarm 118 is configured to be activated or deactivated by the server 120 based on one or more signals/instructions received from the server 120. For example, the response device 116 and/or the alarm 118 is configured to be activated when a non-authorized entry of the entity 110 is detected within the zone 102. Similarly, the response device 116 and/or the alarm 118 is configured to be deactivated when an authorized entry of the entity 110 is detected within the zone 102. In accordance with various embodiments, when the server 120 authenticates the electronic device 106 and authorizes the movement of the entity 110 associated with the electronic device 106, the server 120 deactivates the response device 116 and/or the alarm 118. Similarly, the server 120 activates the alarm 118 and/or the response device 116 upon non-receipt of the second encrypted wireless signal within the predefined time duration or a failure of the authentication of the electronic device 106.

The response device 116 corresponds to any device capable of providing alerts associated with a non-authorized entry of the entity 110 within the zone 102. For example, the response device 116 includes one or more of a display capable of providing visual alerts, a communication device capable of sending messages, an audio device capable of providing audio alerts or any other device known in the art of developed in the future to provide one or more types of alerts to one or more users of the monitoring system 104. In some embodiments, when the monitoring system 104 identifies and/or authorizes the entity 110 associated with the movement, the response device 116 is configured to include the identification of the entity 110 in the alerts. In some embodiments, the response device 116 is a computing device capable of controlling one or more structures, for example, gates, fences, windows, jammers, systems to attack intruders, and similar systems or structures associated with the monitoring system 104 based on one or more signals/instructions received from the server 120. For example, the response device 116 is configured to close the gates and/or windows of one or more buildings in the zone 102 when a non-authorized entry of the entity 110 is detected within the zone 102. The alarm 118 corresponds to any audio device capable of providing audio alerts to the one or more users of the monitoring system 104 based on the signal/instructions from the server 120. For example, the alarm 118 is configured to provide the audio alerts to the user of the monitoring system 104 when a non-authorized entry of the entity 110 is detected within the zone 102. In some embodiments (not illustrated), the response device 116 includes the alarm 118. In some embodiments, depending upon the requirement of the user of the monitoring system 104, the monitoring system 104 includes more than one alarms 118 (for example, alarms 118-1, 118-2, and 118-3 illustrated in FIGS. 6 and 7) installed at different locations within or outside the zone 102.

Referring back to FIG. 1, each electronic device 106 is associated (for example, worn or attached to) the corresponding entity 110. The electronic device 106 corresponds to at least one of a wearable device, a portable device, or any other communication device now known or in the future developed. For example, as illustrated in FIG. 1, the electronic device 106 is a smartphone 106-1, a smartwatch 106-2, an electronic tag 106-3 or any other communication device capable of communicating with the monitoring system 104, now known or in the future developed. Each electronic device 106 is configured to receive the first encrypted wireless signal broadcasted by the monitoring system 104 when the electronic device 106 is within a range of the first encrypted wireless signal. The electronic device 106 is further configured to decrypt the first encrypted wireless signal, generate the second encrypted wireless signal based on the decryption, and transmit the second encrypted wireless signal to the monitoring system 104. In accordance with various embodiments, the range of the first encrypted wireless signal from the monitoring system 104 is configured to ensure coverage of the entire zone 102. In some embodiments, the range of the first encrypted wireless signal is geographically constrained to the zone 102.

In an exemplary embodiment, the electronic device 106 is configured to operate in two different power modes, for example, a low power mode and a full power mode, with a power consumption in the low power mode being substantially lower when compared to a power consumption in the full power mode. For example, the electronic device 106 is configured to power the electronic device transceiver 162 and one or more sub-controllers of the electronic device processor 166 in the low power mode, and each of the electronic device transceiver 162, the electronic device memory 164, and all controllers and/or sub-controllers of the electronic device processor 166 in the full power mode. The one or more sub-controllers of the electronic device processor 166 are configured to control the powering of the other controllers of the electronic device processor 166 when the electronic device 106 is switched from the low power mode to the full power mode.

Figure 5:
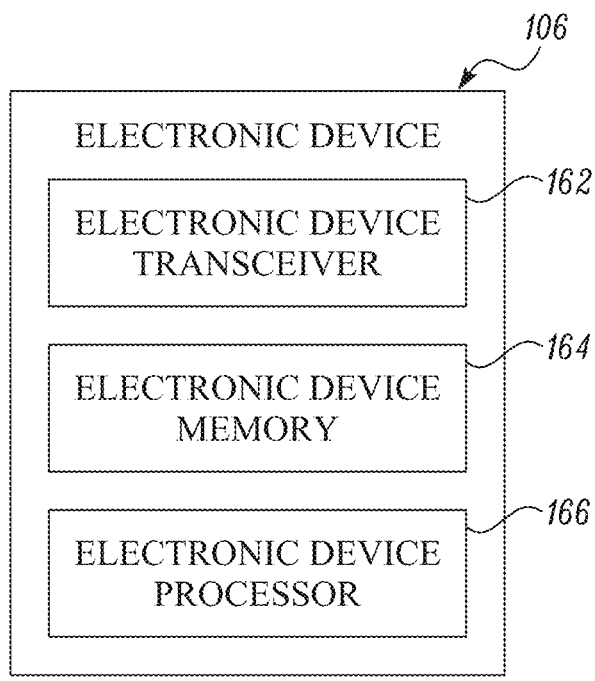
FIG. 5 illustrates a block diagram of an exemplary electronic device for use within the system of FIG. 1, in accordance with some embodiments.

The various components of electronic device 106 will now be described hereinafter with respect to FIG. 5. It should be appreciated by those of ordinary skill in the art that FIG. 5 depicts the electronic device 106 in a simplified manner and a practical embodiment includes additional components and suitably configured logic to support known or conventional operating features that are not described in detail herein. Although the electronic device 106 is illustrated and described to be implemented within a single communication device, it is contemplated that the one or more components of the electronic device 106 are alternatively be implemented in a distributed computing environment Referring to FIG. 5, the electronic device 106 includes, among other components, an electronic device transceiver 162, an electronic device memory 164, and an electronic device processor 166. The components of the electronic device 106, including the electronic device transceiver 162, the electronic device memory 164, and the electronic device processor 166, cooperate with one another to enable operations of the electronic device 106. Each component communicates with one another via a device local interface (not illustrated). The device local interface includes, but not limited to, one or more buses or other wired or wireless connections, as is known in the art. The device local interface includes additional elements, which are omitted for simplicity, such as controllers, buffers (caches), drivers, repeaters, and receivers, among many others, to enable communications. Further, the device local interface includes address, control, and/or data connections to enable appropriate communications among the aforementioned components.

As illustrated, the electronic device 106 includes the electronic device transceiver 162 to transmit one or more signals to and receive one or more signals from the monitoring system 104 (as illustrated in FIG. 1). For example, the device transceiver 162 is configured to receive the first encrypted wireless signal from the monitoring system 104 and transmit the second encrypted wireless signal to the monitoring system 104. The device transceiver 162 includes a transmitter circuitry and a receiver circuitry to enable the electronic device 106 to communicate with the monitoring system 104. In this regard, the transmitter circuitry includes appropriate circuitry to transmit the second encrypted wireless signal to and the receiver circuitry includes appropriate circuitry to receive the first encrypted wireless signal from the monitoring system 104. It will be appreciated by those of ordinary skill in the art that the electronic device 106 includes a single device transceiver 162 as illustrated, or alternatively separate transmitting and receiving components, for example but not limited to, a transmitter, a transmitting antenna, a receiver, and a receiving antenna. In accordance with various embodiments, the electronic device transceiver 162 also includes an infra-red transceiver module (not illustrated) to transmit and receive one or more infra-red signals (for example, the first encrypted wireless signal and the second encrypted wireless signal) to and/or from the monitoring system 104. It would be appreciated that the components and functionality of the infra-red transceiver module integrated in the device transceiver 162 of the electronic device 106 is well known in the art and is not described here for the sake of brevity. In some embodiments (not illustrated), the infra-red transceiver module is a separate from the device transceiver 162.

The electronic device memory 164 is a non-transitory memory configured to store a set of instructions that are executable by the electronic device processor 166 to perform predetermined operations. For example, the electronic device memory 164 includes any of the volatile memory elements (for example, random access memory (RAM)), non-volatile memory elements (for example, read only memory (ROM)), and combinations thereof. Moreover, the electronic device memory 164 incorporates electronic, magnetic, optical, and/or other types of storage media. In accordance with some embodiments, the electronic device memory 164 is also configured to store the at least one key associated with the encryption and/or decryption of the first encrypted wireless signal and the second encrypted wireless signal. In some embodiments, the electronic device memory 164 is also configured to store a cryptographic key to generate the challenge response.

The electronic device processor 166 is configured to execute the instructions stored in the electronic device memory 164 to perform the predetermined operations. In accordance with various embodiments, the electronic device processor 166 is configured to decrypt the first encrypted wireless signal and generate the second encrypted wireless signal based on the decryption. The electronic device processor 166 is further configured to control the electronic device transceiver 162 to transmit the second encrypted wireless signal to the monitoring system 104. In some embodiments, the electronic device processor 166 is configured to modify the power state of the electronic device 106 from the low power mode to the full power mode based on the first encrypted wireless signal (for example, upon receipt of the first encrypted wireless signal).

The electronic device processor 166 includes one or more microprocessors, microcontrollers, DSPs (digital signal processors), state machines, logic circuitry, or any other device or devices that process information or signals based on operational or programming instructions. The electronic device processor 166 is implemented using one or more controller technologies, such as Application Specific Integrated Circuit (ASIC), Reduced Instruction Set Computing (RISC) technology, Complex Instruction Set Computing (CISC) technology, or any other similar technology now known or in the future developed. The electronic device processor 166 is configured to cooperate with other components of the electronic device 106 to perform its operations (described in detail with reference to FIG. 8).

In some embodiments, the system 100 is configured for self-authentication of the at least one electronic device 106 associated with the at least one entity 110 during movement in the zone 102. To this end, each electronic device 106 is configured to detect, via the electronic device processor 166 and the electronic device transceiver 162, the monitoring system 104 within a proximity of the electronic device 106 during the movement. In such cases, the monitoring system 104 is configured to broadcast, via the beacon 114, a beacon signal at regular intervals in the zone 102 and the electronic device 106 is configured to perform a network scan to detect the beacon signal transmitted by the monitoring system 104. The electronic device 106 is configured to detect the monitoring system 104 within the proximity of the electronic device 106 upon detection of the beacon signal.

The electronic device 106 is further configured to transmit, via the electronic device processor 166 and the electronic device transceiver 162, an encrypted wireless signal based on the detection. The encrypted wireless signal corresponds to any self-authentication signal transmitted by the electronic device 106 to the monitoring system 104. For example, the encrypted wireless signal includes self-authentication data associated with the electronic device 106 and encrypted using the at least one key. In accordance with various embodiments, the self-authentication data includes one or more of an identification of the electronic device 106, the certificate of the electronic device 106, the radio-frequency fingerprint of the encrypted wireless signal, or any other data for the self-authentication of the electronic device 106.

The monitoring system 104 is configured to receive, via the beacon 114, the encrypted wireless signal and decrypts, via the at least one processor (for example, the server processor 156 or the beacon processor 148) the encrypted wireless signal. For example, the at least one processor is configured to decrypt the encrypted wireless signal using the at least one key stored in the server memory 154 or the beacon memory 146. The monitoring system 104 is further configured to obtain the self-authentication data based on the decryption and authenticate, via the at least one processor, the electronic device 106 based on the self-authentication data. To this end, the at least one processor is configured to authenticate the electronic device 106 based on the self-authentication data using one or more techniques known in the art or developed in the future. For example, the at least one processor is configured to match the self-authentication data with a predefined authentication data stored in the server memory 154 or the beacon memory 146. The monitoring system 104 is further configured to authorize the movement of the at least one entity based on the authentication and activate or deactivate the alarm 118 or the response device 116 based on the authorization.

Figure 8:
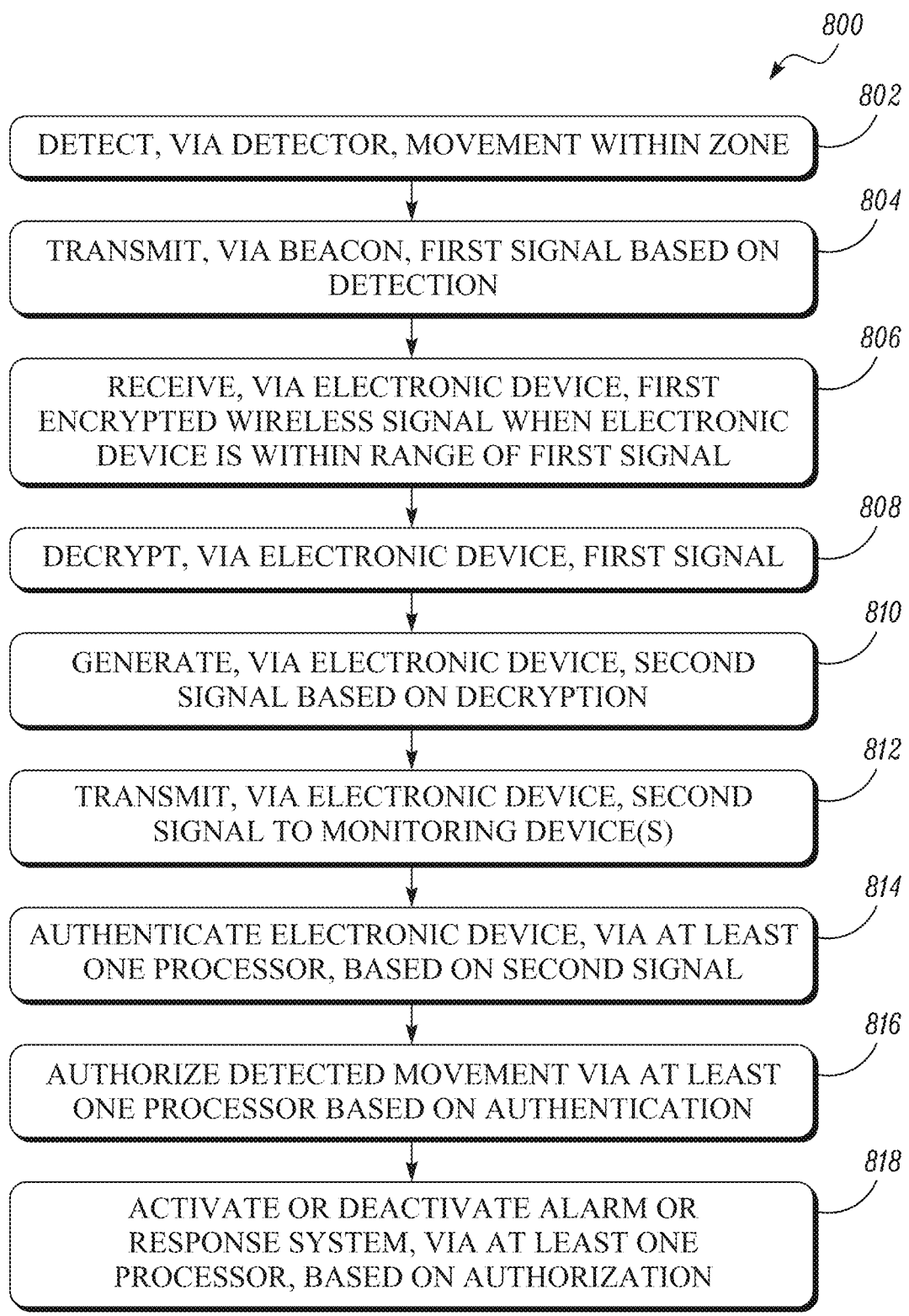
FIG. 8 illustrates a method for authorizing movement of the at least one entity within the at least one zone, in accordance with some embodiments.

Referring to FIG. 8, an exemplary method 800 for authorizing the movement of the entity 110 within the zone 102 is illustrated and described. It would be appreciated by the person skilled in the art that although the method 800 is described for authorizing the movement of one entity 110 within the at least one zone 102, the same method 800 is applicable for authorizing the movement of each entity of the plurality of entities 110-1, 110-2, 110-3 within the zone 102. The method 800 begins, at 802, with the monitoring system 104 detecting, via the detector 112 and at least one processor of the monitoring system 104, the movement of the entity 110 within the zone 102. To this end, the monitoring system 104 periodically, for example, after every specified time period, scans the zone 102 to detect the movement of the entity 110 within the zone 102.

In accordance with various embodiments, the at least one processor of the monitoring system 104 corresponds to the detector processor 134 and/or the server processor 156 of the monitoring system 104. To this end, the sensor 138 captures the data (for example, the temperature data, the visual image data, the thermal image data, or any other detection data) associated with the changes in the zone 102 and provides the data to the server processor 156 or the detector processor 134. As discussed above, the sensor 138 corresponds to the infra-red sensor that measures the infrared radiations emitted by the entity 110 within the zone 102 to detect the changes in the temperature of the zone 102 due to the movement of the entity 110 within the zone 102. The server processor 156 or the detector processor 134 determines the movement of the entity 110 in the zone 102 when the change in the temperature of the zone 102 is greater than the predefined temperature threshold value during the predefined time interval. In some embodiments, the sensor 138 includes the infra-red camera that measures the infrared radiations within the zone 102 and converts the measured infrared radiations into a thermal image. The server processor 156 or the detector processor 134 determines the movement of the entity 110 in the zone 102 when the changes in the heat pattern between the two or more thermal images is greater than the predefined thermal threshold value. In some embodiments, when the sensor 138 includes the camera that captures the visual images of the zone 102. The server processor 156 or the detector processor 134 is configured to detect the movement in the zone 102 based on at least one image input (for example, the visual images) received via the camera. For example, the server processor 156 or the detector processor 134 is configured to detect the movement and identify the entity 110 associated with the movement using one or more artificial intelligence or machine learning models based on the received image input. It would be appreciated by a person skilled in the art that the detection of movement and the identification of an entity 110 in one or more visual images using artificial intelligence or machine learning models is known in the art and hence the details of the same are not described here for the sake of brevity. In some other embodiments, the server processor 156 or the detector processor 134 is configured to detect the movement and identify the entity 110 associated with the movement based on a stored memory of the entities 110.

At 804, the monitoring system 104 transmits, via the beacon 114 and the at least one processor of the monitoring system 104, the first encrypted wireless signal based on the detection. In accordance with various embodiments, the at least one processor of the monitoring system 104 corresponds to the beacon processor 148 or the server processor 156 of the monitoring system 104. The at least one processor of the monitoring system 104 is configured to receive the signal associated with the detection of the movement of the entity 110 within the zone 102 from the detector 112 and transmit, via the beacon transceiver 144, the first encrypted wireless signal in the zone 102 in response to the detected movement.

In an embodiment, the at least one processor of the monitoring system 104 generates a wireless signal including at least the challenge and encrypts the wireless signal using the at least one key stored in the beacon memory 146 and/or the server memory 154, to generate the first encrypted wireless signal. For example, the challenge corresponds to a randomly generated string or value created using various mechanisms known in the art or in the future developed. The at least one processor further transmits, via the beacon transceiver 144, the first encrypted wireless signal in the zone 102 in response to the detected movement.

In an embodiment, the at least one processor of the monitoring system 104 generates the dynamic key valid for the predefined time duration. The dynamic key corresponds to any key that is determined or generated at runtime rather than being fixed or known beforehand. The at least one processor of the monitoring system 104 generates the dynamic key using various mechanisms known in the art or in the future developed. For example, in some embodiments, the at least one processor of the monitoring system 104 generates the dynamic key periodically based on a previous key and data record. In some other embodiments, the at least one processor of the monitoring system 104 generates the dynamic key using a shared secret key.

The at least one processor of the monitoring system 104 generates the first encrypted wireless signal comprising the dynamic key and transmits, via the beacon transceiver 144, the first encrypted wireless signal in the zone 102 in response to the detected movement. It would be appreciated by the person skilled in the art that although the first encrypted wireless signal is described as including the dynamic key, the first encrypted wireless signal can include other data, such as the identifier of the monitoring system 104 and the timestamp of the validity of the dynamic key, without deviating from the scope of the present description.

At 806, the electronic device 106 associated with the entity 110 receives, via the electronic device transceiver 162, the first encrypted wireless signal when the electronic device 106 is within the range of the first encrypted wireless signal (for example, within the zone 102). In some embodiments, the one or more sub-controllers of the electronic device processor 166 modifies the power state of the electronic device 106 from the low power mode to the full power mode based on the first encrypted wireless signal (for example, upon reception of the first encrypted wireless signal).

At 808, the electronic device 106 decrypts, via the electronic device processor 166, the first encrypted wireless signal. To this end, the electronic device processor 166 obtains the at least one key stored in the electronic device memory 164 and decrypts the first encrypted wireless signal based on the at least one key to obtain the challenge.

At 810, the electronic device 106 generates, via the electronic device processor 166, the second encrypted wireless signal based on the decryption. To this end, the electronic device processor 166 generates the challenge response to the obtained challenge. For example, the challenge response is generated by combining the challenge with the cryptographic key stored in the electronic device memory 164. In accordance with various embodiments, the cryptographic key is different for each electronic device 106. The electronic device processor 166 then encrypts the challenge response with the at least one key stored in the electronic device memory 164 to generate the second encrypted wireless signal. In some embodiments, the second encrypted wireless signal includes at least one of the first identification of the second encrypted wireless signal, the code, the certificate of the electronic device 106, the radio-frequency fingerprint of the second encrypted wireless signal, or the challenge response.

At 812, the electronic device 106 transmits, via the electronic device processor 166 and the electronic device transceiver 162, the second encrypted wireless signal to the monitoring system 104. For example, the electronic device 106 transmits, via the electronic device processor 166 and the electronic device transceiver 162, the second encrypted wireless signal to the at least one processor of the monitoring system 104. As discussed above, the at least one processor of the monitoring system 104 corresponds to the beacon processor 148 or the server processor 156 of the monitoring system 104.

At 814, the at least one processor of the monitoring system 104 authenticates the electronic device 106 based on the second encrypted wireless signal. To this end, the server processor 156 obtains the at least one key stored in the beacon memory 146 and/or the server memory 154 and decrypts the second encrypted wireless signal based on the at least one key to obtain the challenge response. The server processor 156 then compares the challenge response with a predetermined challenge response stored in the beacon memory 146 and/or the server memory 154 to authenticate the electronic device 106.

In some embodiments, the second encrypted wireless signal includes at least one of the first identification of the second encrypted wireless signal, the code, the certificate of the electronic device 106, the radio-frequency fingerprint of the second encrypted wireless signal, or the challenge response, the at least one processor of the monitoring system 104 decrypts the second encrypted wireless signal and obtains the at least one first identification, the code, the certificate, the radio-frequency fingerprint, or the challenge response based on the decryption. The at least one processor further determines a match between the at least one first identification, the code, the certificate, the radio-frequency fingerprint, or the challenge response and at least one of the second identification, the code, the certificate, the radio-frequency fingerprint, or the challenge response stored in a storage unit (for example, the server memory 154 or the beacon memory 146) of the at least one monitoring system 104. The monitoring system 104 then authenticates the electronic device 106 based on the determined match.

In some embodiments, a frequency associated with the first encrypted wireless signal and the second encrypted wireless signal is the same or different. In such cases, the monitoring system 104 authenticates the electronic device 106 based on the frequency of the second encrypted wireless signal. For example, the radio wave frequency of the first encrypted signal transmitted by the monitoring system 104 is different from the radio wave frequency of the second encrypted signal transmitted by the electronic device 106 and the monitoring system 104 is configured to authenticate the electronic device 104 based on the radio wave frequency of the second encrypted signal transmitted by the electronic device 106.

In some embodiments, the monitoring system 104 is configured to authenticate the electronic device 106 based on the second encrypted wireless signal received within the predefined time duration. For example, the monitoring system 104 is configured to define the predefined time duration to receive the response via the first encrypted signal and thereafter, configured to authenticate the electronic device 104 for instances when the second encrypted signal is received within the predefined time duration.

At 816, the monitoring system 104 authorizes, via the at least one processor of the monitoring system 104 (for example, the server processor 156), the detected movement of the entity 110 associated with the electronic device 106 based on the authentication. At 818, the monitoring system 104 activates or deactivates, via the at least one processor of the monitoring system 104 (for example, the server processor 156), the alarm 118 or the response device 116 based on the authorization. In some embodiments, the monitoring system 104 authorizes the detected movement or deactivates the alarm 118 or the response device 116 for the predetermined time duration. Alternatively, the monitoring system 104 activates the alarm 118 or the response device 116 upon the non-receipt of the second encrypted wireless signal within the predefined time duration or the failure of the authentication of the electronic device 106. In accordance with various embodiments, the monitoring system 104 is configured to request the electronic device 106 to reauthenticate itself after the predefined time duration. To this end, the method 800 loops back to 802 after the predefined time duration to detect the movement or presence of the entity 110 in the zone 102. Alternatively, the electronic device 106 is configured to reauthenticate itself after the predefined time duration by providing the self-authentication data to the monitoring system 102 for self-authentication.

Figure 6:
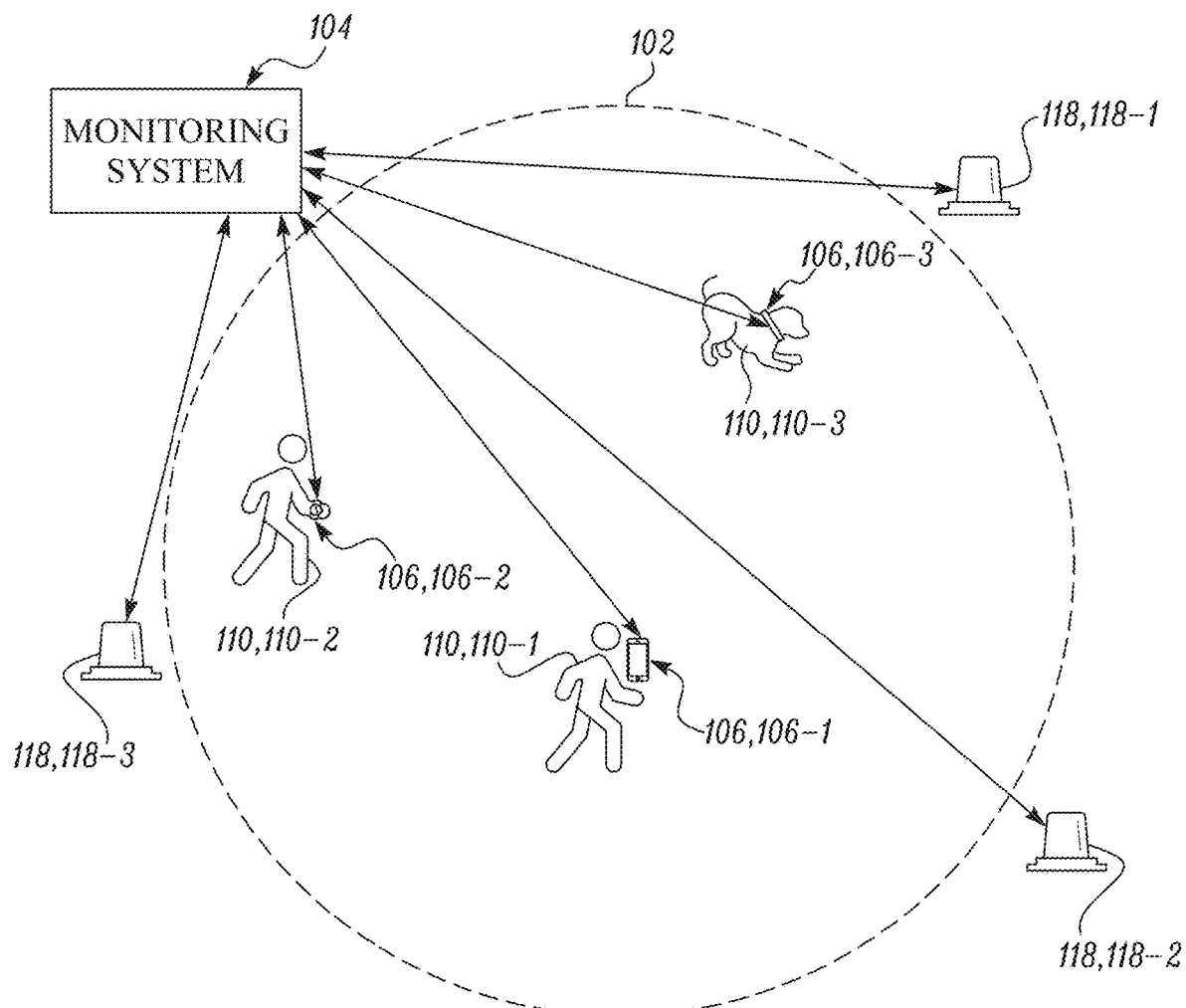
FIGS. 6 and 7 illustrate exemplary scenarios for authorizing movement of the at least one entity within the at least one zone, in accordance with some embodiments.
Figure 7:
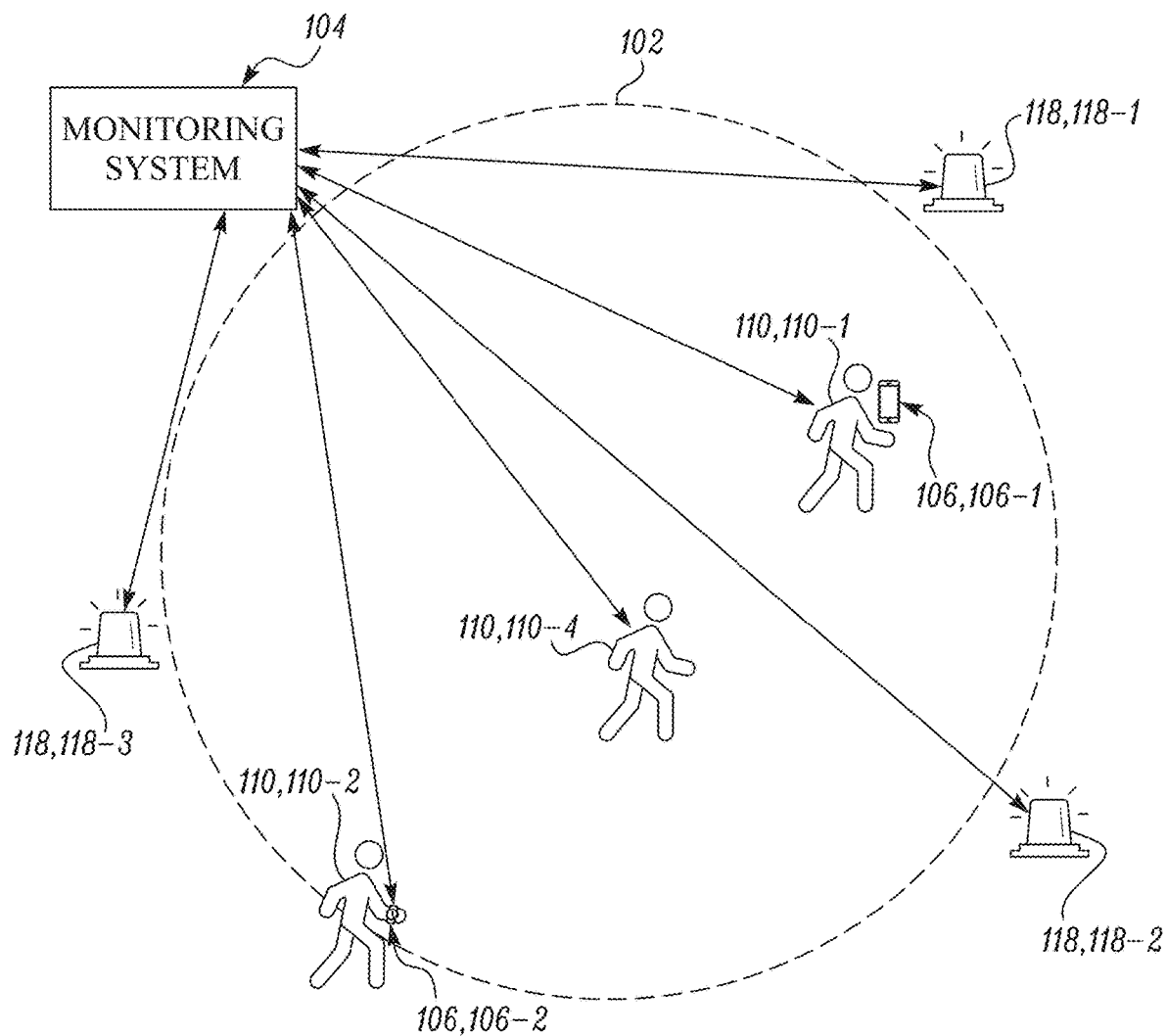

In some embodiments, when the monitoring system 104 detects the movement of a plurality of entities 110 in the zone 102, the monitoring system 104 authorizes the movement of the plurality of entities 110 when a number of the electronic devices 106 authenticated by the monitoring system 104 correspond to a number of the plurality of entities 110 detected in the zone 102. For example, as illustrated in FIG. 6, the monitoring system 104 deactivates the alarms 118-1, 118-2, 118-3 when three (3) electronic devices 106-1, 106-2, 106-3 authenticated by the monitoring system 104 corresponds to three (3) entities 110-1, 110-2, 110-3 detected in the zone 102. Alternatively, the monitoring system 104 detects a non-authorized movement of at least one entity 110 of the plurality of entities 110 in the zone 102, when even a single electronic device 106 is not authenticated, for example, when a number of the electronic devices 106 authenticated by the monitoring system 104 is less than a number of the plurality of entities 110 detected in the zone 102. For example, as illustrated in FIG. 7, the monitoring system 104 activates the alarms 118-1, 118-2, 118-3 when only two (2) electronic devices 106-1, 106-2 are authenticated by the monitoring system 104 as compared to the three (3) entities 110-1, 110-2, and 110-4 detected in the zone 102. In the example illustrated in FIG. 7, the entity 110-4 corresponds to the non-authorized entity without any authenticated electronic device.

The system and the method of the present description is directed towards preventing unnecessary triggering of the alarm 118 or the response device 116 of the monitoring system 104 when the movement or presence of any authorized entity, such as a pet, a family member, or a vehicle, is detected in the zone 102. By broadcasting the first encrypted wireless signal in the zone 102 upon detection of the entity 110 in the zone 102 to authenticate the electronic device 106 and authorizing the detected movement of entities with authenticated electronic devices 106, the system and the method of the present description ensures proper authorization of the movement of such entities 110 within the zone 102. This prevents any needless and repeated triggering of the alarm 118 or the response device 116 of the monitoring system 104 for the authorized entities 110 without compromising the security within the zone 102.

In the hereinbefore specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that can cause any benefit, advantage, or solution to occur or become more pronounced are not to be construed as a critical, required, or essential feature or elements of any or all the claims. The invention is defined solely by the appended claims including any amendments made during the pendency of this application and all equivalents of those claims as issued.

Moreover, in this document, relational terms such as first and second, top and bottom, and the like are used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but includes other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but also be configured in ways that are not listed.

It will be appreciated that some embodiments are comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention claimed is:

1. A system for authorizing movement of at least one entity in at least one zone, comprising:
    at least one monitoring system comprising at least one detector and at least one beacon communicatively coupled to the at least one detector, wherein the at least one monitoring system is configured to:
        detect, via the at least one detector and at least one processor of the at least one monitoring system, the movement of the at least one entity within the at least one zone,
        transmit, via the at least one processor and the beacon, a first encrypted wireless signal in response to the detected movement; and
    at least one electronic device associated with the at least one entity configured to:
        receive, via a transceiver of the at least one electronic device, the first encrypted wireless signal when the at least one electronic device is within a range of the first encrypted wireless signal,
        decrypt, via a processor of the at least one electronic device, the first encrypted wireless signal,
        generate, via the processor, a second encrypted wireless signal based on the decryption, and
        transmit, via the processor and the transceiver, the second encrypted wireless signal to the at least one monitoring system,
    wherein the at least one monitoring system further comprises an alarm or a response device and is configured to:
        receive, via the beacon, the second encrypted wireless signal,
        authenticate, via the at least one processor, the at least one electronic device based on the received second encrypted wireless signal,
        authorize the detected movement of the at least one entity upon the authentication of the at least one electronic device, and
        deactivate the alarm or the response device based on the authorization.

2. The system of claim 1, wherein the detector comprises at least one sensor for detecting the movement.

3. The system of claim 1, wherein the detector comprises an infra-red camera and an infra-red sensor, the beacon corresponds to an infra-red beacon, and the first encrypted wireless signal or the second encrypted wireless signal corresponds to an infra-red signal.

4. The system of claim 1, wherein the at least one monitoring system is configured to activate the alarm or the response device upon non-receipt of the second encrypted wireless signal within a predefined time duration or a failure of the authentication of the at least one electronic device.

5. The system of claim 1, wherein the at least one electronic device corresponds to at least one of a wearable device, a portable device, or a communication device, and the at least one entity corresponds to at least one of a human, an animal, or a manually controlled or autonomous vehicle.

6. The system of claim 1, wherein the at least one processor corresponds to a first processor associated with the detector to detect the movement and a second processor associated with the beacon to transmit the first encrypted signal based on the detected movement.

7. The system of claim 1, wherein a frequency associated with the first encrypted wireless signal and the second encrypted wireless signal is same or different, and the at least monitoring system is configured to authenticate the at least one electronic device based on the frequency of the second encrypted wireless signal.

8. The system of claim 1, wherein the at least monitoring system is configured to authorize the detected movement or deactivate the alarm or the response device for a predetermined time duration.

9. The system of claim 1, wherein the second encrypted wireless signal comprises at least one first identification, code, certificate, radio-frequency fingerprint, or challenge response, and the at least one monitoring system is configured to:
    decrypt, via the at least one processor, the second encrypted wireless signal;
    obtain, via the at least one processor, the at least one first identification, code, certificate, radio-frequency fingerprint, or challenge response based on the decryption;
    determine, via the at least one processor, a match between the at least one first identification, code, certificate, radio-frequency fingerprint, or challenge response and at least one second identification, code, certificate, radio-frequency fingerprint, or challenge response stored in a storage unit of the at least one monitoring system; and
    authenticate, via the at least one processor, the at least one electronic device based on the determined match.

10. The system of claim 1, wherein the at least one monitoring system is configured to generate, via the at least one processor, a dynamic key valid for a predefined time duration, the first encrypted wireless signal comprising the dynamic key; and authenticate the at least one electronic device based on the second encrypted wireless signal received within the predefined time duration.

11. The system of claim 1, wherein the at least one electronic device is configured to decrypt the first encrypted wireless signal and the at least one monitoring system is configured to decrypt the second encrypted wireless signal based on at least one key stored in the at least one electronic device and the at least one monitoring system respectively.

12. The system of claim 1, wherein at least one detector comprises a camera and the at least one processor is configured to detect the movement based on at least one image input received via the camera.

13. The system of claim 12, wherein the at least one monitoring system is configured to identify, via the at least one processor, an entity associated with the movement using one or more artificial intelligence or machine learning models based on the at least one received image input.

14. The system of claim 1, wherein the at least one electronic device is configured to modify, via the processor, a power state of the at least one electronic device based on the first encrypted wireless signal.

15. The system of claim 1, wherein the at least one monitoring system comprises a server communicatively coupled to the at least one detector and the beacon, wherein the server is configured to:
  receive, via a transceiver of the server, at least one input associated with the detected movement from the at least one detector; and
  initiate the transmission of the first encrypted wireless signal via the beacon based on the at least one received input.

16. A method for authorizing movement of at least one entity within at least one zone, comprising:
  detecting, via a detector and at least one processor of at least one monitoring system, a movement within the at least one zone;
  transmitting, via the at least one processor and a beacon of the at least one monitoring system, a first encrypted wireless signal based on the detection;
  receiving, via a transceiver of at least one electronic device associated with the at least one entity, the first encrypted wireless signal when the at least one electronic device is within a range of the first encrypted wireless signal;
  decrypting, via a processor of the at least one electronic device, the first encrypted wireless signal;
  generating, via the processor, a second encrypted wireless signal based on the decryption;
  transmitting, via the processor and the transceiver, the second encrypted wireless signal to the at least one monitoring system;
  authenticating, via the at least one processor, the at least one electronic device based on the second encrypted wireless signal;
  authorizing, via the at least one processor, the detected movement based on the authentication; and
  activating or deactivating, via the at least one processor, an alarm or response device based on the authorization.

17. The method of claim 16, wherein the second encrypted wireless signal comprises at least one first identification, code, certificate, radio-frequency fingerprint, or challenge response, and the method comprises:
  decrypting, via the at least one processor, the second encrypted wireless signal;
  obtaining, via the at least one processor, the at least one first identification, code, certificate, radio-frequency fingerprint, or challenge response based on the decryption;
  determining, via the at least one processor, a match between the at least one first identification, code, certificate, radio-frequency fingerprint, or challenge response and at least one second identification, code, certificate, radio-frequency fingerprint, or challenge response stored in a storage unit of the at least one monitoring system; and
  authenticating, via the at least one processor, the at least one electronic device based on the determined match.

18. The method of claim 16, wherein the method comprises:
  receiving, via the detector, at least one input associated with the detected movement; and
  identifying, via the at least one processor, an entity associated with the movement using an artificial intelligence or machine learning model based in the at least one received input.

19. The method of claim 16, wherein the method comprises:
  modifying, via the processor, a power state of the at least one electronic device based on the first encrypted wireless signal.

* * * * *